United States Patent
Phillips et al.

(10) Patent No.: US 6,519,562 B1
(45) Date of Patent: Feb. 11, 2003

(54) DYNAMIC SEMANTIC CONTROL OF A SPEECH RECOGNITION SYSTEM

(75) Inventors: Michael S. Phillips, Belmont, MA (US); Etienne Barnard, Somerville, MA (US); Jean-Guy Dahan, Brookline, MA (US); Michael J. Metzger, Cambridge, MA (US)

(73) Assignee: Speechworks International, Inc., Boston, MA (US)

( * ) Notice: Subject to any disclaimer, the term of this patent is extended or adjusted under 35 U.S.C. 154(b) by 0 days.

(21) Appl. No.: 09/258,012

(22) Filed: Feb. 25, 1999

(51) Int. Cl.⁷ .............................................. G10L 15/08
(52) U.S. Cl. ...................... 704/240; 704/254; 704/255; 704/256; 704/9
(58) Field of Search ........................... 704/9, 256, 255, 704/254, 251, 270, 240, 236

(56) References Cited

U.S. PATENT DOCUMENTS

| | | | |
|---|---|---|---|
| 4,593,367 A | * 6/1986 | Slack et al. ................. 364/513 |
| 4,984,178 A | 1/1991 | Hemphill et al. ........ 364/513.5 |
| 5,146,406 A | * 9/1992 | Jensen ........................ 364/419 |
| 5,390,279 A | * 2/1995 | Strong ........................ 704/200 |
| 5,418,717 A | * 5/1995 | Su et al. ......................... 704/9 |
| 5,475,588 A | 12/1995 | Schabes et al. ........ 364/419.08 |
| 5,642,519 A | 6/1997 | Martin ........................ 395/759 |
| 5,675,707 A | * 10/1997 | Gorin et al. ................. 704/257 |
| 5,717,828 A | 2/1998 | Rothenberg ................ 395/2.79 |
| 5,797,123 A | * 8/1998 | Chou et al. ................. 704/256 |
| 5,799,276 A | 8/1998 | Komissarchik et al. ..... 704/251 |
| 5,828,999 A | * 10/1998 | Bellegarda et al. ......... 704/240 |
| 6,173,266 B1 | * 1/2001 | Marx et al. ................. 704/270 |

* cited by examiner

Primary Examiner—Vijay Chawan
(74) Attorney, Agent, or Firm—Fish & Richardson P.C.

(57) ABSTRACT

A method and apparatus are provided for automatically recognizing words of spoken speech using a computer-based speech recognition system according to a dynamic semantic model. In an embodiment, the speech recognition system recognizes speech and generates one or more word strings, each of which is a hypothesis of the speech, and creates and stores a probability value or score for each of the word strings. The word strings are ordered by probability value. The speech recognition system also creates and stores, for each of the word strings, one or more keyword-value pairs that represent semantic elements and semantic values of the semantic elements for the speech that was spoken. One or more dynamic semantic rules are defined that specify how a probability value of a word string should be modified based on information about external conditions, facts, or the environment of the application in relation to the semantic values of that word string. A speech recognition application, upon receiving the keyword-value pairs, instructs the speech recognizer to modify one or more of the probability values, according to the dynamic semantic rules. The dynamic semantic rules are applied to the word strings and the keyword-value pairs. The speech recognizer modifies one or more of the probability values, re-orders the word strings, and returns control to the application. As a result, the speech recognizer may adjust dynamically to a changing likelihood that a speaker uttered a particular utterance, as the application executes, depending on the context of the application and the external factors.

26 Claims, 3 Drawing Sheets

DYNAMIC SEMANTIC CONTROL OF A SPEECH RECOGNITION SYSTEM

FIELD OF THE INVENTION

The present invention generally relates to data processing. The invention relates more specifically to speech recognition systems.

BACKGROUND OF THE INVENTION

Speech recognition systems are specialized computer systems that are configured to process and recognize spoken human speech, and take action or carry out further processing according to the speech that is recognized. Such systems are now widely used in a variety of applications including airline reservations, auto attendants, order entry, etc. Generally the systems comprise either computer hardware or computer software, or a combination.

Speech recognition systems typically operate by receiving an acoustic signal, which is an electronic signal or set of data that represents the acoustic energy received at a transducer from a spoken utterance. The systems then try to find a sequence of text characters ("word string") which maximizes the following probability:

$$P(A|W)*P(W)$$

where A means the acoustic signal and W means a given word string. The P(A|W) component is called the acoustic model and P(W) is called the language model.

A speech recognizer may be improved by changing the acoustic model or the language model, or by changing both. The language may be word-based or may have a "semantic model," which is a particular way to derive P(W).

Typically, language models are trained by obtaining a large number of utterances from the particular application under development, and providing these utterances to a language model training program which produces a word-based language model that can estimate P(W) for any given word string. Examples of these include bigram models, trigram language models, or more generally, n-gram language models.

In a sequence of words in an utterance, $W_0$-$W_m$, an n-gram language model estimates the probability that the utterance is word j given the previous n−1 words. Thus, in a trigram, $P(W_j|utterance)$ is estimated by $P(W_j|W_j-1, W_j-2)$. The n-gram type of language model may be viewed as relatively static with respect to the application environment. For example, static n-gram language models cannot change their behavior based upon the particular application in which the speech recognizer is being used or external factual information about the application. Thus, in this field there is an acute need for an improved speech recognizer that can adapt to the particular application in which it is used.

An n-gram language model, and other word-based language models work well in applications that have a large amount of training utterances and the language model does not change over time. Thus, for applications in which large amounts of training data are not available, or where the underlying language model does change over time, there is a need for an improved speech recognizer that can produce more accurate results by taking into account application-specific information.

Other needs and objects will become apparent from the following detailed description.

SUMMARY OF THE INVENTION

The foregoing needs, and other needs and objects that will become apparent from the following description, are achieved by the present invention, which comprises, in one aspect, a method of dynamically modifying one or more probability values associated with word strings recognized by a speech recognizer based on semantic values represented by keyword-value pairs derived from the word strings, comprising the steps of creating and storing one or more rules that define a change in one or more of the probability values when a semantic value matches a pre-determined semantic tag, in which the rules are based on one or more external conditions about the context in which the speech recognizer is used; determining whether one of the conditions currently is true, and if so, modifying one or more of the probability values that match the tag that is associated with the condition that is true.

According to one feature, the speech recognizer delivers the word strings to an application program. The determining step involves determining, in the application program, whether one of the conditions currently is true, and if so, instructing the speech recognizer to modify one or more of the probability values of a word string associated with a semantic value that matches the tag that is associated with the condition that is true.

Another feature involves representing the semantic values as one or more keyword-value pairs that are associated with the word strings recognized by the speech recognizer; delivering the keyword-value pairs to an application program; and determining, in the application program, whether one of the conditions currently is true, and if so, instructing the speech recognizer to modify the probability value of the word strings that are associated with the keyword-value pairs that match the tag that is associated with the condition that is true.

Yet another feature involves delivering the words and semantic values to an application program that is logically coupled to the speech recognizer; creating and storing, in association with the speech recognizer, a function callable by the application program that can modify one or more of the probability values of the word strings associated with semantic values that match the tag that is associated with the condition that is true; determining, in the application program, whether one of the conditions currently is true, and if so, calling the function with parameter values that identify how to modify one or more of the semantic values.

A related feature involves re-ordering the word strings after modifying one or more of the probability values. Another feature is modifying the probability values by multiplying one or more of the probability values by a scaling factor that is associated with the condition that is true.

In another feature, the method involves delivering one or more word-value pairs that include the semantic values to an application program that is logically coupled to the speech recognizer. A function is created and stored, in association with the speech recognizer, which can modify one or more of the probability values of word strings associated with words of word-value pairs that match the tag word that is associated with the condition that is true. It is determined, in the application program, whether one of the conditions currently is true, and if so, calling the function with parameter values that identify how to modify a probability value of a word string associated with the semantic values, including a scaling factor that is associated with the condition that is true. The function may modify a probability value by multiplying the probability value by the scaling factor.

The invention also encompasses a computer-readable medium and apparatus that may be configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
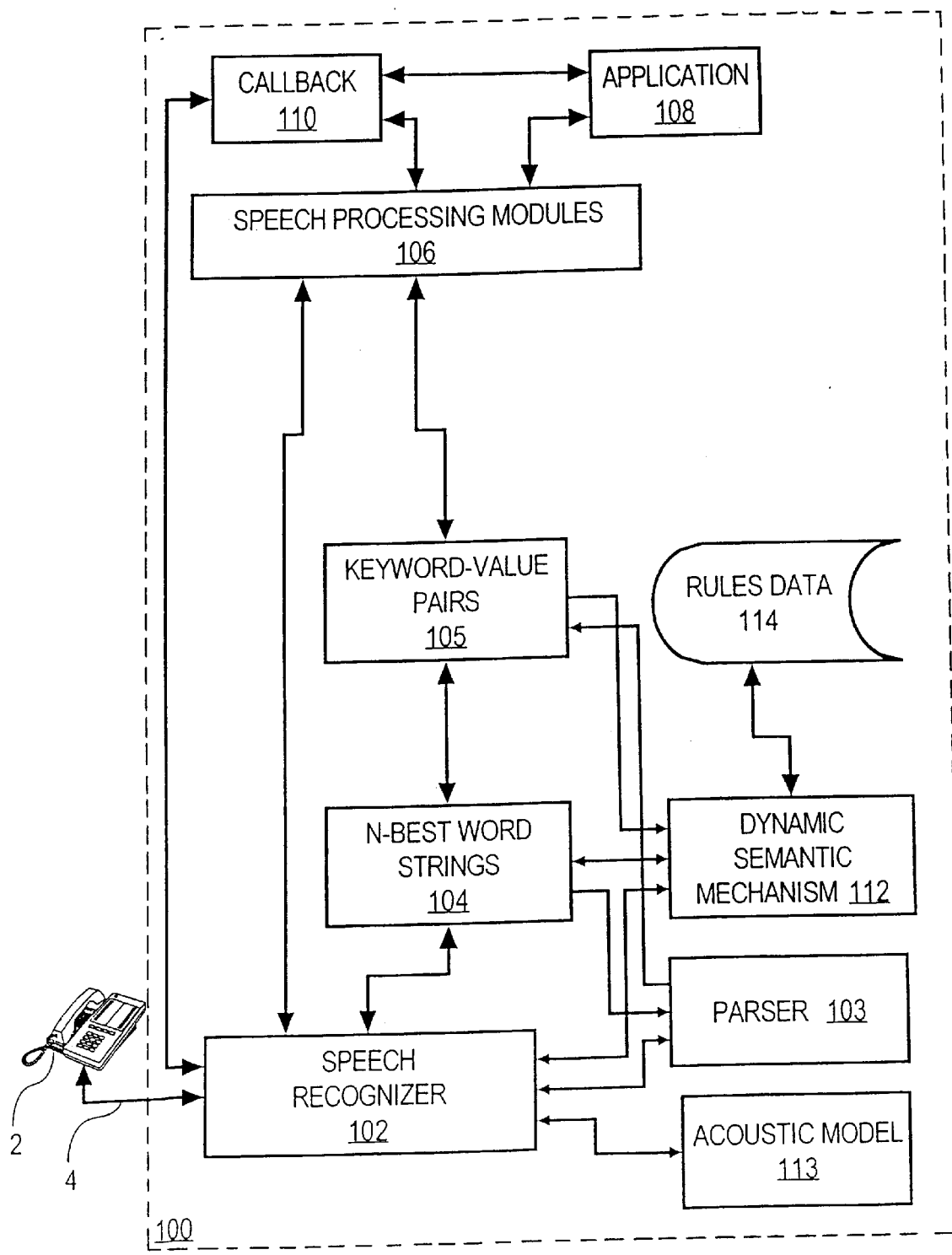
FIG. 1 is a block diagram of a speech recognition system.

A method and apparatus for speech recognition processing using a dynamic semantic model is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Theory of Operation of Speech Recognition System Using Dynamic Semantic Model For cases where large amounts of training data are not available, or where the underlying language model does change over time, a speech recognizer may be improved by deriving the model from the meaning of the utterances, rather than only from the word level. Such use of semantic information can greatly improve the accuracy of the language model in these cases.

For example, consider an airline flight reservation system. A customer of the airline telephones a dedicated telephone number that is associated with an interactive voice response ("IVR") system that includes a speech recognizer. The IVR system prompts the customer to speak the dates on which the customer wishes to travel.

Using a static, word-based language model for recognizing spoken words that represent dates is a fairly weak approach. Such a model would learn that the probability of the user speaking "December sixteenth" is similar to the probability of speaking "September fifteenth." The model also would learn that both of these are somewhat more likely than the probability of the user speaking "the sixteenth of December," and much more likely than "September one five". Thus, a static word-based language model cannot help the speech recognizer resolve confusion between whether a particular utterance represents the word "December" or the word "September."

The airline may know, however, from experience that customers who use the IVR system generally travel within the next few days. So, if the current date is December 14, it is much more likely that a user will speak "December sixteenth" than "September fifteenth". This fact is an example of semantic information that may be used in resolving ambiguities within a recognizer and improving its performance.

The term "semantic model" means that the probability of the word string is based in part on the underlying meaning of the utterance. In the above example, the probability values that a given utterance is "December sixteenth" or the "day after tomorrow" will be based both on the probability of the user wanting to travel two days from now and the probability that they will speak it in each of these two ways.

The term "dynamic semantic model" means that the semantic model may cause one or more probability values, each of which is associated with a word string, to change. The change may occur based upon information that describes external events and responses to be taken when the external events occur. A particular change may be determined based on one or more semantic values which represent particular abstract language elements of an utterance, combined with the information that describes external events. In the example above, the semantic model may cause one or more probability values associated with the strings "December sixteenth" and "September fifteenth" to change depending on information that identifies the current date.

According to another example embodiment, a semantic model is configured to operate on city name values in a travel system. In this model, City Name is a keyword. The system may create and store, in association with instances of the keyword, one or more values that indicate whether an utterance is a particular city name depending on the area code which the caller is calling from. For example, assume that a speech recognizer receives data identifying the caller, including an area code value that indicates the caller is calling from area code "617". Further assume that the speech recognizer receives an utterance and generates two word strings that may represent the utterance, namely, "BOSTON" and "AUSTIN". The speech recognizer also creates and stores a probability value in association with each word string. The probability value indicates the likelihood that the word string is what was actually spoken. The speech recognizer also creates and stores a keyword-value pair associated with each word string. The keyword-value pair of the first word string is (City Name, "BOSTON"). The keyword-value pair for the second word string is (City Name, "AUSTIN").

As a result, the speech recognizer cannot determine whether it has recognized either "BOSTON" or "AUSTIN" as the City Name value. Since the area code of Boston, Mass. is "617", it is highly unlikely that the origin city of the caller is AUSTIN and it is also highly unlikely that the destination city of the caller is BOSTON. Thus, based on the area code information and the keyword-value pairs, using a dynamic semantic mechanism, the probability value associated with one word string or the other may be changed, or appropriately weighted.

Another example may involve a semantic model for company names in a stock quote and trading system. Assume that the system has a semantic keyword called Stock, and that a customer or user of the system has a stock portfolio that includes shares of IBM Corporation. Assume further that a hypothetical company called "I-Beam Corporation" is traded on an exchange. In this situation, if the speech recognizer identifies an utterance that could be confused among "IBM" and "I-BEAM," the semantic model determines that it is far more likely that the utterance is "IBM" because the customer has that stock in their portfolio. Thus, the probability value that is assigned to the two word strings, e.g., "IBM" or "I-BEAM", depends on the stocks which appear in each user's portfolio.

It has been determined that some applications may realize important benefits from the use of such dynamic semantic models. It has been determined that in some cases there are very significant accuracy gains compared to static word-based language models.

Since most speech recognizers operate fundamentally on word strings and not on semantic information, the dynamic semantic models may be applied as a post-recognition process. For example, the speech recognizer may determine the n-best word strings, and a parser with meaning extraction is applied to convert the n-best word strings to n-best sets of keyword-value pairs. A probability value is stored in association with each of the word strings or each of the keyword-value pairs. The semantic models are applied and used to modify one or more of the probability values, and the n-best sets of keyword-value pairs are re-ordered. Alternatively, the word strings are re-ordered.

In an embodiment, the semantic models may be applied using one or more callbacks. An application that is executing in cooperation with the speech recognizer may use the one or more callbacks to alter the values associated with any keyword based on semantic information that the developer provides.

Example of System Structure

FIG. 1 is a block diagram showing principal elements of a speech recognition system 100. Telephone 2 is coupled by connection 4, which may pass through the public switched telephone network (PSTN) or any other voice or data network, to transceive voice or speech information with speech recognizer 102. In an example application, telephone 2 is associated with a customer of an entity that owns or operates speech recognition system 100, which executes an interactive voice response application 108 to provide a customer service. Examples of suitable customer service applications are catalog ordering, stock trading, and airline reservations.

The speech recognizer 102 is coupled to an acoustic model 113 and a dynamic semantic mechanism 112. Acoustic model 113 comprises information that assists speech recognizer 102 in carrying out speech recognition functions on the signals received from telephone 2. For example, speech recognizer 102 uses acoustic model 113 to determine which phoneme, among a plurality of phonemes, is most likely represented by one or more frames or segments of speech received from telephone 2. Speech recognizer 102 may provide as output a set of likely phonemes. Preferably, speech recognizer 102 also outputs one or more word strings that are the most probable words represented by the phonemes. There may be n word strings and they are normally ordered from best to worst, according to a probability value that is created and stored in association with the word strings. Accordingly, the word strings are called n-best word strings 104.

Speech recognizer 102 is also coupled to a dynamic semantic mechanism 112 which in turn is coupled to and uses data 114. Dynamic semantic mechanism 112 assists speech recognizer 112 in carrying out higher-order speech recognition functions on the signals received from telephone 2. For example, speech recognizer 102 uses dynamic semantic mechanism 112 to determine which words, from among a plurality of words, represent the semantics of the n-best word strings 104. The dynamic semantic mechanism may be implemented as a function, subroutine, method, or other software process that is callable from application 108, speech processing modules 106, or from speech recognizer 102.

Data 114 is information about the environment of system 100 or other external facts or conditions that may affect the output of speech recognizer 102. In one embodiment, data 114 may be implemented in the form of a table, list, or other data structure that is stored in non-volatile memory and loaded into main memory when speech recognizer 102 initializes. The table may store a list of key values that may be matched to utterances of a speaker, and substitute values that are substituted when an utterance matches a key value or is within a range of key values. The table may also store, for each key value, a weight value, a floor value and an offset value that are used to modify the probability value associated with a particular word string among n-best word strings 104.

The data 114 may comprise a table of statistical information derived from long use of the application 108, or may comprise rules or data that is based on such statistical information. For example, when application 108 is an airline reservation system, it may be found through long use of the application in a real-time environment that customers located within area code "617" (Boston and environs) almost always make flight reservations in which the departing city is Boston. This semantic rule is derived from statistics or log files, stored by the application 108 when it is executing, that show repeated instances of recognizing "BOSTON" as the departing city when the caller is in area code "617".

In operation, upon receiving a speech input from telephone 2, speech recognizer 102 may create a set of the n-best word strings 104 that are represented by the speech. Speech recognizer 102 then applies a parser 103 to the n-best word strings 104. Parser 103 may be a Backus-Naur Form (BNF) type of parser that analyzes the n-best word strings 104 to determine the linguistic semantics that are represented by the word strings. As a result, parser 103 creates and stores one or more keyword-value pairs 105 for each of the word strings.

Each keyword-value pair represents the semantics of one of the n-best word strings 104. For example, consider an utterance in an airline reservation system in which the speaker says the departure city and arrival city for a flight. One utterance of a speaker might be, "I want to fly from Boston to Denver on March 24." Speech recognizer 102 might generate two n-best word strings 104 from this utterance, namely Word String A="I want to fly from Boston to Denver on March 24" and Word String B="I want to fly from Austin to Denver on March 24." Word String A might have a probability value of "90" and Word String B might have a probability value of "20", in which a higher value is more probable, on a scale of "0" to "100". Parser 103 could create the following keyword-value pairs for Word String A: (FROM-CITY, BOSTON); (TO-CITY, DENVER); (DATE, 24-MAR-1999). Parser 103 could create the following keyword-value pairs for Word String B: (FROM-CITY, AUSTIN); (DATE, 24-MAR-2000).

Preferably, a single probability value is created and stored in association with each of the word strings within the n-best word strings 104. The probability value represents the likelihood that a particular word string was in fact uttered by the speaker. Alternatively, the system may create and store a probability value for each keyword-value pair that is associated with a word string, and could also combine such probability values into one value for that whole string.

Speech recognizer 102 may also pass the n-best word strings 104 to one or more speech processing modules 106, which are software elements that carry out still higher-order speech processing functions. An example of a commercial product that is suitable for use as speech processing modules 106 is DialogModules™, commercially available from SpeechWorks International, Inc., of Boston, Mass.

Speech processing modules 106 cooperate with and may be used by the application 108 to carry out its logical operations. For example, application 108 may call one of the speech processing modules to determine whether a speaker using telephone 2 uttered a "YES" or "NO" response to a particular prompt generated by the application 108. Details about one embodiment of speech processing modules that interact with an application program are set forth in co-pending U.S. patent application Ser. No. 09/081,719, filed May 6, 1998, entitled System and Method for Developing Interactive Speech Applications, and naming as inventors Matthew T. Marx, Jerry K. Carter, Michael S. Phillips, Mark A. Holthouse, Stephen D. Seabury, Jose L. Elizondo-Cecenas, and Brett D. Phaneuf.

Since speech recognizer 102 deals with word strings rather than semantic information, the dynamic semantic models may be applied as a post-process. A callback 110 is coupled to application 108 and to speech recognizer 102 and n-best word strings 104. Callback 110 may be implemented in the form of a function call, defined according to an application programming interface (API), that application 108 may call to alter the probability value of any word string based on its keyword-value pairs and rules data 114. In one embodiment, the callback is called with parameters that include a keyword, a value, a scaling factor that is used to adjust the probability value of the associated word string, and one or more semantic tags that define when to apply the scaling factor.

Table 1 sets forth an example, in the C programming language, of a function that carries out application of a dynamic semantic model in the context of processing a time value, as well as a callback that may be placed in an application program for accessing the function. The function is named "get_time_lm()" and the callback is named "TimeLMCallback." The data structure TIME_LM *tlm contains the language model in the form of a table, and is read in during start-up time.

In this example, each row of the data structure TIME_LM comprises a key value in minutes (num_in_lm), an array of substitute time values, a floor value, a weight value, and an offset value. If the time value in minutes uttered by a speaker matches one of the key values, then the function obtains the corresponding substitute value from the data structure. The substitute value is returned, less the offset and multiplied by the weight value. Otherwise, the function returns the floor value. Thus, a value in a keyword-value pair associated with an uttered time value may be modified by comparing the uttered time value to one or more time values that are expected to be uttered, based on the current application and its context. Alternatively, the probability value of an associated word string may be modified.

In one embodiment, the floor value enables the system to ensure that a semantic value which is unlikely, but still possible, is ascribed a predetermined minimum probability value that is greater than zero. This prevents unlikely utterances from being undesirably filtered out by the dynamic semantic mechanism. The offset value may enable the system to adjust or move the lowest assigned probability value to any desired value. In effect, use of an offset value moves the range of probability values up or down. In some embodiments, the offset value may be zero and the minimum probability value may be zero.

In still other embodiments, the probability value generated by the dynamic semantic mechanism, or some combination of the weight, offset, and floor values, is combined with an acoustic probability value to yield a final or global probability value.

Generating a probability value may be carried out by taking the logarithm of a root probability value. Thus, the computation for determining a modified probability value

TABLE 1

CODE EXAMPLE

```
static int get_time_lm(TIME_LM *tlm, int time_in_minutes)
{
    float lm_value;
    if((time_in_minutes >= 0) && (time_in_minutes <tlm->num_in_lm)) {
        lm_value = tlm->lm[time_in_minutes];
        log_msg(0, 3,"Setting time lm to lm[%d] = %8.4f\n",time_in_minutes lm_value);
    }
    else {
        log_msg(0, 3,"Setting time lm to floor = %8.4f\n", tlm->floor);
        lm_value = tlm->floor;
    }
    return (int) (tlm->weight * (lm_value - tlm->offset));
}
int TimeLMCallback (const char * parse, int * score, void * data,
            ALTsrBNFParseStorage *bnfdata)
{
    int time_in_minutes;
    int lm_value;
    TIME_LM * time_lm;
    time_lm = (TIME_LM *) data;
    if(time_lm == NULL) {
        log_msg(0, 3,"Time Language Model is NULL in TimeLMCallback\n");
        return 0;
    }
    time_in_minutes = get_time_in_minutes(parse);
    lm_value = get_time_lm(time_lm, time_in_minutes);
    log_msg(0, 3,"TIME LM :%s time_in_minutes %d LM %d\n", parse,
            time_in_minutes_lm_value);
    *score = lm_value;
    return 0;
}
``` from the current probability value associated with a word string may be:

Probability=(log(Current Probability)*Weight)+Offset)>=Floor

In any of these embodiments, operation of system 100 may proceed as follows. A customer or user of system 100 calls the system. Application 108 executes and prompts the customer to speak some information. The customer provides a speech signal at telephone 2, and the signal is communicated over connection 4 to speech recognizer 102. Speech recognizer 102 carries out speech recognition of the signal by using acoustic model 113 to convert the speech signal into one or more phonemes that are recognized or detected within the signal. Speech recognizer 102 may then convert the one or more phonemes into the n-best word strings 104 that may be represented by the phonemes. A probability value is created and stored in association with each of the n-best word strings 104. The probability value represents the likelihood that a particular word string is what was actually uttered.

Speech recognizer 102 may then apply parser 103 to the n-best word strings. The parser 103 has meaning extraction capabilities. As a result, one or more keyword-value pairs 105 are created and stored. The keyword-value pairs 105 represent the semantics of the speaker's utterance. Each keyword is an abstract identifier for some word or language element that has been recognized within the speech signal. Each keyword may be associated with a variable in application 108. Each value is something that has been recognized as spoken for the associated abstract language element. For example, a keyword could be "FROM-CITY" and an associated value could be "AUSTIN."

The keyword-value pairs are passed up to speech processing modules 106, which may carry out logical operations based on the keyword-value pairs. In some cases, the speech processing modules 106 will pass the keyword-value pairs up to application 108 for further processing and logical decision-making according to business rules that are embodied in the application.

Application 108 may instruct speech recognizer 102 to change one of the probability values that is stored in association with one of the word strings, based on one or more of the keyword-value pairs, and according to the current semantic context and semantic decisions made by the application. For example, consider the above keyword-value pair (FROM-CITY, "AUSTIN"). From other information available to it, the application 108 may determine that the caller is calling from area code "617" and therefore that it is extremely unlikely that the caller wants to depart from Austin. In response, the application may change the probability value of one of the n-best word strings 104 that is associated with the keyword-value pair (FROM-CITY, "AUSTIN") to better reflect the actual semantics of the utterance.

In an embodiment, application 108 may call a subroutine, method or procedure of speech recognizer 102 and pass parameters that define how the speech recognizer should change a probability value. Speech recognizer 102 receives and executes the function call according to the parameter. In response, after changing the probability value, speech recognizer 102 sorts or re-orders the n-best word strings 104 pairs to take into account the changed value.

As a result, speech recognizer 102 adjusts the way it recognizes speech from the customer or user dynamically according to the current semantic context of the application. Accordingly, improved accuracy is achieved in speech recognition.

Speech Recognition Method Using Dynamic Semantic Model

Figure 2:
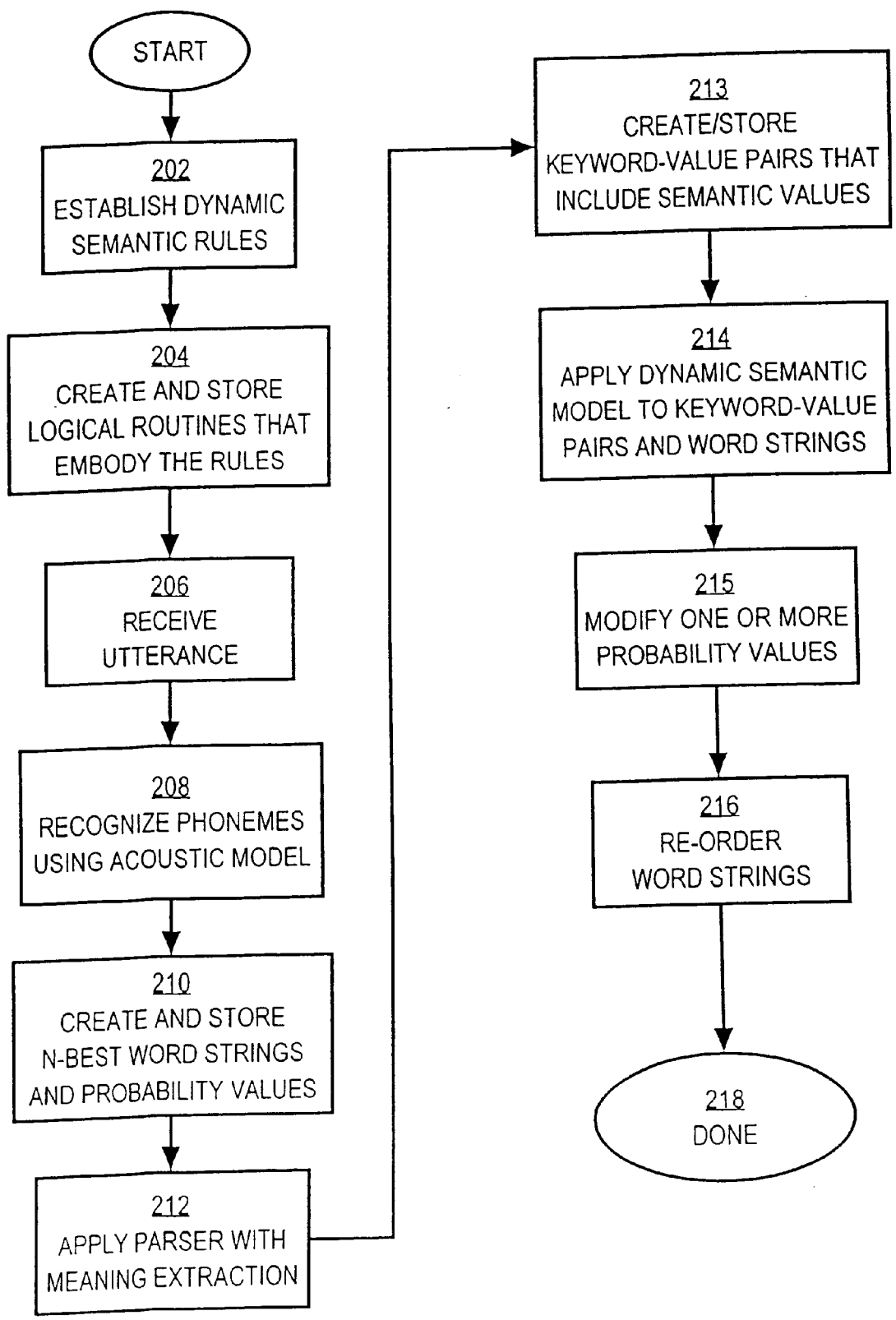
FIG. 2 is a flow diagram of a method of speech recognition processing using a dynamic semantic model.

FIG. 2 is a flow diagram of a method of carrying out speech recognition using a dynamic semantic model.

In block 202, one or more dynamic semantic rules are established. Block 202 may also involve analyzing statistical information about the actual performance of application 108, and deriving rules data 114 based upon log files, statistics files, etc. Thus, rules data 114 and the rules identified in block 202 may be derived probabilistically based on statistics tables or performance information from an application.

Alternatively, block 202 may involve the abstract definition of business rules or semantic rules that change according to the context of the application or according to one or more external factors. An example of a dynamic semantic rule is:

WHEN(AreaCode=617)THEN(DestinationCity!=BOSTON).

In one embodiment, the semantic rules are established by placing, in an application program, one or more calls to a function of the speech recognizer that carries out modifications of probability values of word strings that are associated with keyword-value pairs representing the semantic context of the current application. The semantic rules each include a semantic tag that defines the application context, external conditions, or internal conditions for which a probability value is to be modified. Each semantic tag may be associated with a scaling factor that defines how to change the probability value. Examples of scaling factors include "0.2", "50%", etc. The current value is multiplied by the scaling factor to arrive at the modified value. Alternatively, each semantic tag is associated with a substitute value, and the current value is removed and replaced by the substitute value.

In block 204, one or more logical routines that embody the dynamic semantic rules are created and stored. Block 204 may involve placing one or more function calls in an application program that operates in coordination with a speech recognizer. Each of the function calls has one or more parameters that implement the dynamic semantic rules. In alternate embodiment, the application may contain all the business logic and processing logic needed to alter the values, without calling back to the speech recognizer.

In block 206, an utterance is received. The utterance may be received, for example, when a customer or user of a speech recognition system calls the system. The application executes and prompts the customer to speak some information. The customer provides a speech signal at a telephone which is communicated to the speech recognizer.

In block 208, the speech recognizer carries out speech recognition of the signal by using an acoustic model to convert the speech signal into one or more phonemes. In block 210, the speech recognizer may convert the one or more phonemes into the n-best word strings that may be represented by the phonemes. Block 210 may also involve creating and storing a probability value in association with each of the n-best word strings. The probability value indicates the likelihood that the word string is what was actually spoken.

In block 212, speech recognizer may apply a parser with meaning extraction to the n-best word strings. As a result, one or more keyword-value pairs are created and stored for each of the word strings, as indicated by block 213. The keyword-value pairs represent abstract language elements and associated values that have been recognized in the speaker's utterance. Optionally, each keyword-value pair may be associated with a keyword probability value that represents a likelihood that the associated value is what was actually spoken for that keyword.

The keyword-value pairs may be passed up to one or more speech processing modules, which may carry out logical operations based on the keyword-value pairs. In some cases, the speech processing modules will pass the keyword-value pairs up to the application for further processing and logical decision-making according to business rules that are embodied in the application.

In block 214, a dynamic semantic model is applied to the keyword-value pairs. In one embodiment, the application may instruct the speech recognizer to change a probability value of a word string associated with one or more of the keywords, according to the current semantic context and semantic decisions made by the application. Thus, a probability value is modified, as shown in block 215.

For example, consider the airline reservation system example discussed above. In a function or subroutine, the application may read the current value of the system clock of the computer system on which the application is running. The application thus may determine that the current date is "December 2." If the application then receives word strings and associated keyword-value pairs that include (Current-Month, "September") and (Current-Month, "December"), i.e., one or more ambiguous or confused values, the application may determine that "September" is not likely to be the actual utterance. Stated abstractly, the application could determine that when a hypothesized word is a month that is less than the current month, then the hypothesized word is not likely to be part of the arrival date, so the probability value of its associated word string should be changed or scaled.

In an embodiment, the application may call a subroutine, method or procedure of the speech recognizer and pass parameters that define how the speech recognizer should change the probability value of a word string that is associated with a keyword-value pair. The speech recognizer receives and executes the function call according to the parameter. Execution of the function call may involve examining a current keyword-value pair, comparing it to a table of expected or likely values for that keyword, and modifying the probability value of a word string associated with the current keyword according to a substitute value, a weight, or an offset value. The substitute value, weight, and offset values may be selected in advance by an application developer according to the current context of the application In block 216, after changing the value, the speech recognizer sorts or re-orders the word strings to take into account the changed value. The re-ordered word strings may be passed to and used by an application program in carrying out any desired function.

As a result, the speech recognizer recognizes speech from the customer or user, and modifies its output according to the current semantic context of the application.

Hardware Overview

Figure 3:
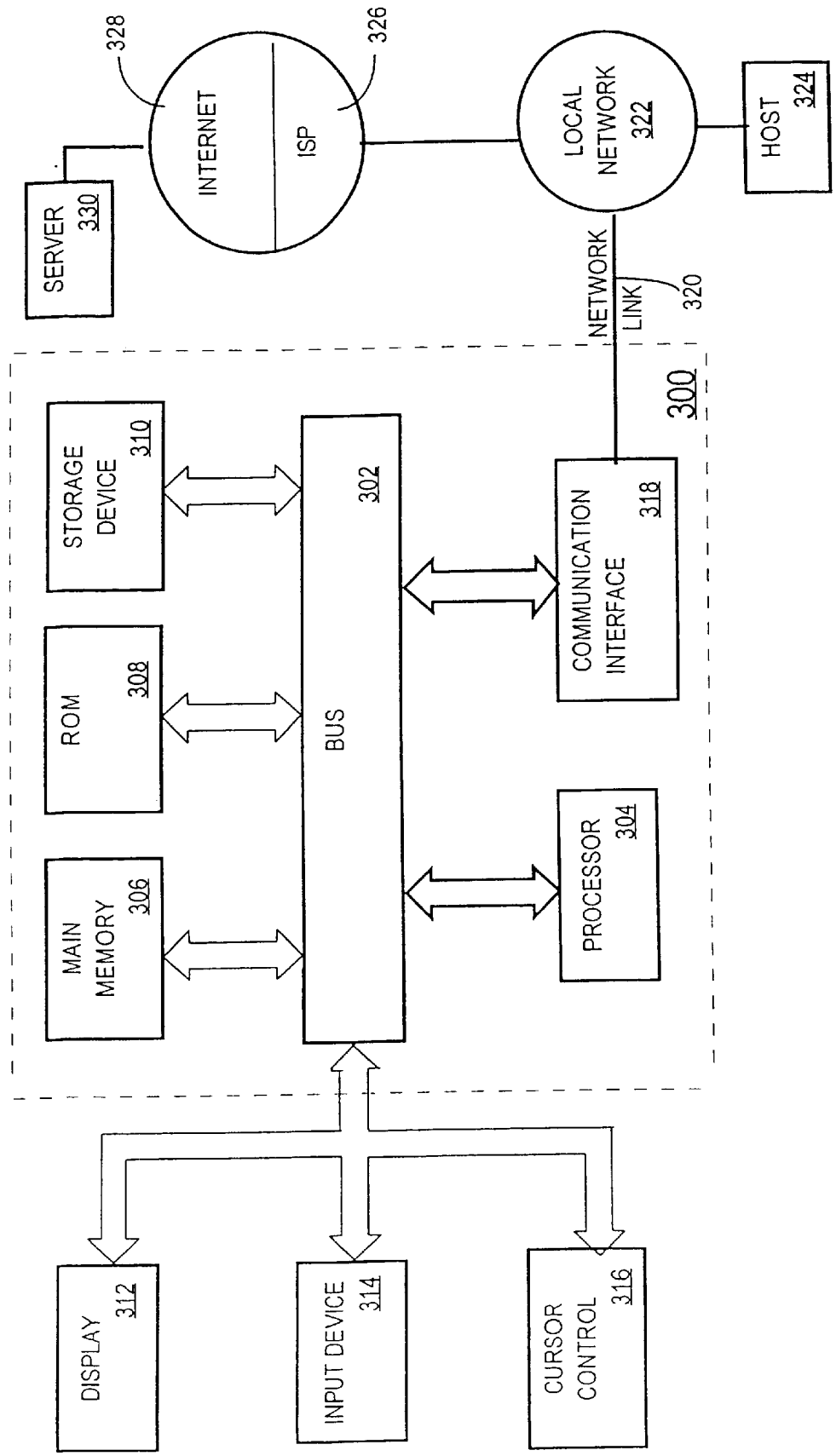
FIG. 3 is a block diagram of a computer system with which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for speech recognition processing using a dynamic semantic model. According to one embodiment of the invention, speech recognition processing using a dynamic semantic model is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for speech recognition processing using a dynamic semantic model as described herein.

The received code may be executed by processor 304 as it is received, and/or stored in storage device 310, or other non-volatile storage for later execution. In this manner, computer system 300 may obtain application code in the form of a carrier wave.

The description in this document may be presented in terms of algorithms and symbolic representations of operations on data bits within a computer memory. The algorithms descriptions and representations are the means used by those skilled in the data processing arts to most effectively convey the substance of their work to others skilled in the art.

An algorithm may be generally understood as a self-consistent sequence of steps leading to a desired result. These steps generally require physical manifestation of physical quantities. Usually, though not necessarily, these quantities take the form of electrical or magnetic signals capable of being stored, transferred, combined, compared and otherwise manipulated. This document may refer to these signals as bits, values, elements, symbols, characters, terms, numbers, or the like. However, all of these terms are to be associated with appropriate physical quantities and are merely convenient labels applied to these quantities.

Further, the manipulations performed are often referred to in terms (such as "adding" or "comparing") that are commonly associated with mental operations performed by a human operator. No such capability of a human operator is necessary, or desirable in most cases, in any of the operations described herein, unless specifically identified otherwise. The operations are machine operations. Useful machines for performing the operations of the present invention include general-purpose digital computers or other similar devices. This document relates to method of operating a computer in processing electrical or other physical signals to generate other desired physical signals.

One embodiment of the invention is an apparatus for performing these operations. Such an apparatus may be specially constructed for the required purposes or it may comprise a general-purpose digital computer as selectively activated or re-configured by a computer program stored in the computer. The algorithms presented herein are not inherently related to any particular computer or other apparatus. In particular, various general-purpose machines may be used with the teachings herein, or it may prove more convenient to construct more specialized apparatus to perform the required method steps. The required structure for a variety of these machines will appear from the description in this document.

In the foregoing specification, the invention has been described with reference to specific embodiments thereof. The description includes numerous details in order to provide a thorough understanding. These details may be omitted, and various modifications and changes may be made thereto without departing from the broader spirit and scope of the invention. The specification and drawings are, accordingly, to be regarded in an illustrative rather than a restrictive sense.

What is claimed is:

1. A method of modifying probability values associated with hypotheses that are recognized by a speech recognizer comprising:

processing one or more rules that each defines a change in a probability value of a recognition hypothesis recognized by the speech recognizer and that are each associated with a corresponding condition external to the speech recognizer, including determining whether the condition associated with one of the rules is true, and if so, applying the rule to modify a probability value of the recognition hypothesis.

2. The method as recited in claim 1, further comprising delivering semantic values associated with the recognition hypothesis to an application program, and wherein processing of the one or more rules is performed by the application program according to the delivered semantic values.

3. The method as recited in claim 1, further comprising:

delivering one or more keyword-value pairs that are associated with the recognition hypothesis to an application program; and determining, in the application program, whether the condition is true.

4. The method as recited in claim 3, further comprising re-ordering the recognition hypotheses after modifying the probability values.

5. The method as recited in claim 1, further comprising delivering the recognition hypothesis to an application program that is coupled to the speech recognizer, wherein processing the one or more rules is performed by the application program, and applying the rule includes calling a function of the speech recognizer with parameter values that identify how to modify the probability value.

6. The method as recited in claim 1, further comprising applying the rules to modify a plurality of probability values each associated with a different one of a plurality of recognition hypotheses recognized by the speech recognizer for an input utterance and re-ordering the recognition hypotheses after modifying the probability values.

7. The method as recited in claim 1, wherein applying the rule to modify the probability value includes multiplying the probability value by a scaling factor that is associated with the condition that is true.

8. The method as recited in claim 1, further comprising:
    delivering one or more keyword-value pairs to an application program that is coupled to the speech recognizer;
    wherein the processing of the one or more rules rule is performed by the application program, and wherein applying the rule includes applying a scaling factor that is associated with the condition that is true.

9. The method as recited in claim 1, further comprising storing the rules including storing a table of predetermined semantic tags, wherein each of the semantic tags is associated with a substitute probability value; and
    wherein applying the rule includes executing a function call that changes of the probability value to the substitute probability value when the recognition hypothesis matches a pre-determined semantic tag.

10. The method as recited in claim 1, further comprising storing the rules including storing a table of pre-determined semantic tags, wherein each of the semantic tags is associated with a substitute probability value, a weight value, and an offset value; and
    wherein applying the rule includes executing a function call that changes the probability value according to one or more of the substitute probability value, the weight value, and the offset value when the recognition hypothesis matches one of the pre-determined semantic tags.

11. A method of recognizing utterances received at a speech recognizer, comprising:
    converting an utterance into a plurality of word strings, including determining one or more semantic values associated with each word string, in which each semantic value includes a keyword that represents a semantic element of the utterance and a value that represents a portion of the utterance that corresponds to the semantic element;
    storing a probability value in association with each of the word strings;
    storing one or more rules that each defines a change in a probability value associated with a word string when one or more of the semantic values associated with that word string matches a pre-determined semantic tag, in which each rule is based on an external condition of the context in which the speech recognizer is used;
    determining whether one of the external conditions is true, and if so, modifying the probability values of the word strings associated with semantic values that match the semantic tags for rules that are associated with the condition that is true; and
    re-ordering the word strings according to the probability values.

12. The method as recited in claim 11, in which modifying the probability values further comprises multiplying one or more of the probability values by a scaling factor that is associated with the condition that is true.

13. The method as recited in claim 11, further comprising delivering the semantic values to an application program that is coupled to the speech recognizer;
    wherein determining whether one of the external conditions is true is performed by the application program and modifying the probability values includes calling a function of the speech recognizer with parameter values that identify how to modify the probability values.

14. A computer-readable medium carrying one or more sequences of instructions for modifying probability values associated with hypotheses that are recognized by a speech recognizer wherein execution of the one or more sequences of instructions by one or more processors causes the one or more processors to perform steps comprising:
    processing one or more rules that each defines a change in a probability value of a recognition hypothesis recognized by the speech recognizer and that are each associated with a corresponding condition external to the speech recognizer, including
    determining whether the condition associated with one of the rules is true, and if so, applying the rule to modify a probability value of the recognition hypothesis.

15. The computer-readable medium as recited in claim 14, wherein the steps further comprise delivering semantic values associated with the recognition hypothesis to an application program, and wherein processing of the one or more rules is performed by the application program according to the delivered semantic values.

16. The computer-readable medium as recited in claim 14, wherein the steps further comprise:
    delivering one or more keyword-value pairs that are associated with the recognition hypothesis to an application program; and
    determining, in the application program, whether the condition is true.

17. The computer-readable medium as recited in claim 16, wherein the steps further comprise re-ordering the recognition hypotheses after modifying the probability values.

18. The computer-readable medium as recited in claim 14, wherein the steps further comprise delivering the recognition hypothesis to an application program that is coupled to the speech recognizer, wherein processing the one or more rules is performed by the application program, and applying the rule includes calling a function of the speech recognizer with parameter values that identify how to modify the probability value.

19. The computer-readable medium as recited in claim 14, wherein the steps further comprise applying the rules to modify a plurality of probability values each associated with a different one of a plurality of recognition hypotheses recognized by the speech recognizer for an input utterance and re-ordering the recognition hypotheses after modifying the probability values.

20. The computer-readable medium as recited in claim 14, wherein applying the rule to modify the probability value includes multiplying the probability value by a scaling factor that is associated with the condition that is true.

21. The computer-readable medium as recited in claim 14, wherein the steps further comprise:
    delivering one or more keyword-value pairs to an application program that is coupled to the speech recognizer;
    wherein the processing of the one or more rules rule is performed by the application program, and wherein applying the rule includes applying a scaling factor that is associated with the condition that is true.

22. The computer-readable medium as recited in claim 14, wherein the steps further comprise storing the rules including storing a table of pre-determined semantic tags, wherein each of the semantic tags is associated with a substitute probability value; and wherein applying the rule includes executing a function call that changes of the probability value to the substitute probability value when the recognition hypothesis matches a pre-determined semantic tag.

23. The computer-readable medium as recited in claim 14, wherein the steps further comprise storing the rules including storing a table of pre-determined semantic tags, wherein each of the semantic tags is associated with a substitute probability value, a weight value, and an offset value; and wherein applying the rule includes executing a function call that changes the probability value according to one or more of the substitute probability value, the weight value, an the offset value when the recognition hypothesis matches one of the pre-determined semantic tags.

24. A computer-readable medium carrying one or more sequences of instructions for recognizing utterances that are received by a speech recognizer, wherein execution of the one or more sequences of instructions by one or more processors causes the one or more processors to perform steps comprising:

converting an utterance into a plurality of word strings, including determining one or more semantic values associated with each word string, in which each semantic value includes a keyword that represents a semantic element of the utterance and a value that represents a portion of the utterance that corresponds to the semantic element;

storing a probability value in association with each of the word strings;

storing one or more rules that each defines a change in a probability value associated with a word string when one or more of the semantic values associated with that word string matches a pre-determined semantic tag, in which each rule is based on an external condition of the context in which the speech recognizer is used;

determining whether one of the external conditions is true, and if so, modifying the probability values of the word strings associated with semantic values that match the semantic tags for rules that are associated with the condition that is true; and re-ordering the word strings according to the probability values.

25. The computer-readable medium as recited in claim 24, in which modifying the probability values further comprises multiplying one or more of the probability values by a scaling factor that is associated with the condition that is true.

26. The computer-readable medium as recited in claim 25, wherein the steps further comprise:

delivering the semantic values to an application program that is coupled to the speech recognizer;

wherein determining whether one of the external conditions is true is performed by the application program and modifying the probability values includes calling a function of the speech recognizer with parameter values that identify how to modify the probability values.

\* \* \* \* \*

UNITED STATES PATENT AND TRADEMARK OFFICE
CERTIFICATE OF CORRECTION

PATENT NO. : 6,519,562 B1
DATED : February 11, 2003
INVENTOR(S) : Michael S. Phillips et al.

It is certified that error appears in the above-identified patent and that said Letters Patent is hereby corrected as shown below:

Title page,
Item [56], References Cited, insert the following:
-- OTHER PUBLICATIONS
Harper et al., "Semantics and Constraint Parsing of Word Graphs", Proc. ICASSP, 1992
Rayner et al., "Combining Knowledge Sources to Reorder N-Best Speech Hypothesis Lists", Proc. ARPA Workshop on Human Language Technology, Princeton, 1994
Schwartz et al., "New Uses of the N-Best Sentence Hypothesis within the Bybols Speech Recognition System", Proceedings ICASSP, 1992 --.

Signed and Sealed this

Thirteenth Day of December, 2005

JON W. DUDAS
*Director of the United States Patent and Trademark Office*